United States Patent
Zimmermann

(10) Patent No.: US 9,068,826 B2
(45) Date of Patent: Jun. 30, 2015

(54) CHECKING A BLADE CONTOUR OF A TURBOMACHINE

(75) Inventor: Hans Zimmermann, Landshut (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 14/116,248

(22) PCT Filed: May 9, 2012

(86) PCT No.: PCT/DE2012/000476
§ 371 (c)(1),
(2), (4) Date: Nov. 7, 2013

(87) PCT Pub. No.: WO2012/152255
PCT Pub. Date: Nov. 15, 2012

(65) Prior Publication Data
US 2014/0076038 A1 Mar. 20, 2014

(30) Foreign Application Priority Data

May 10, 2011 (DE) .......................... 10 2011 101 097

(51) Int. Cl.
G01B 21/20 (2006.01)
F01D 5/00 (2006.01)
G05B 19/401 (2006.01)
F01D 5/14 (2006.01)

(52) U.S. Cl.
CPC ............... *G01B 21/20* (2013.01); *F01D 5/005* (2013.01); *F05D 2240/301* (2013.01); *F05D 2240/303* (2013.01); *F05D 2260/80* (2013.01); *G05B 19/401* (2013.01); *G05B 2219/35128* (2013.01); *G05B 2219/37205* (2013.01); *F01D 5/14* (2013.01); *Y02T 50/673* (2013.01); *G05B 2219/35066* (2013.01)

(58) Field of Classification Search
CPC .................. Y02T 50/673; F01D 5/141; G05B 2219/45147; G05B 19/401; G01B 21/20
USPC ........................................................ 73/112.01
See application file for complete search history.

(56) References Cited

U.S. PATENT DOCUMENTS

| 7,310,588 | B2 * | 12/2007 | Mentz et al. ................... 702/155 |
| 7,519,215 | B2 * | 4/2009 | Gower ........................... 382/141 |
| 8,175,842 | B2 * | 5/2012 | Cameron et al. .............. 702/167 |
| 8,718,975 | B2 * | 5/2014 | Lobato et al. ................. 702/167 |
| 2004/0057057 | A1 * | 3/2004 | Isaacs et al. ................... 356/601 |
| 2005/0106998 | A1 * | 5/2005 | Lin et al. ............................ 451/5 |
| 2006/0020432 | A1 * | 1/2006 | Gower ............................... 703/1 |
| 2006/0245918 | A1 * | 11/2006 | Senoo et al. ................... 415/191 |
| 2007/0107180 | A1 * | 5/2007 | Mentz et al. ............... 29/407.05 |
| 2009/0306930 | A1 * | 12/2009 | Cameron et al. .............. 702/167 |
| 2011/0301915 | A1 * | 12/2011 | Lobato et al. ................. 702/167 |

FOREIGN PATENT DOCUMENTS

| DE | 42 23 483 | 1/1994 |
| EP | 1 615 153 | 1/2006 |
| EP | 1 777 495 | 4/2007 |

(Continued)

*Primary Examiner* — Freddie Kirkland, III
(74) *Attorney, Agent, or Firm* — Davidson, Davidson & Kappel, LLC

(57) ABSTRACT

A method for checking a blade contour of a turbomachine, in particular a gas turbine, wherein an actual contour (1; 1') of a blade is detected, wherein a target contour of the blade is scaled and the actual contour is compared with said scaled contour (2).

15 Claims, 2 Drawing Sheets

(56) References Cited

FOREIGN PATENT DOCUMENTS

| GB | 2 350 809 | 12/2000 |
| WO | WO 2008/001043 | 1/2008 |
| WO | WO 2010/099890 | 9/2010 |

* cited by examiner

CHECKING A BLADE CONTOUR OF A TURBOMACHINE

The present invention relates to a method for checking a blade contour of a turbomachine, in particular a gas turbine, and a blade contour checking means and a computer program product for carrying out such a method.

BACKGROUND

In particular moving blades and guide blades of compressor stages and turbine stages of aircraft engines must be checked during production and/or maintenance. Inter alia, the profile shape is checked on the suction side and/or pressure side of the blades. In particular, their leading edges and/or trailing edges are checked as to whether the actual radii are in a predefined tolerance range.

This has previously been carried out according to internal practice, by registering an actual contour of the particular blade and ascertaining a minimum inscribed circle of curvature for this contour automatically and comparing its radius to a setpoint edge radius. For this purpose, FIG. 2 schematically shows as an example a part of a blade cross section having an actual contour 1 and a setpoint edge radius $r_{tot}$. Due to a small local deviation of the actual contour from a setpoint contour, the inscribed circle of curvature having minimal radius of curvature $r_{lok}$ is ascertained therein and compared as the edge radius to setpoint edge radius $r_{tot}$. As a result, as is recognizable in the example, actual profile 1 is classified as flawed in the automatic evaluation due to the large deviation between minimal radius of curvature $r_{lok}$ and setpoint edge radius $r_{tot}$, which requires an additional manual check by trained personnel. Since in the example actual contour 1 corresponds sufficiently with a setpoint contour, which is described in the area of the leading edge by setpoint edge radius $r_{tot}$, the blade is accepted therein. Accordingly, the previously known automatic check by ascertainment of and comparison to minimal inscribed circles of curvature results in erroneous objections and therefore in substantial additional effort due to the manual check by trained personnel.

SUMMARY OF THE INVENTION

It is an object of the present invention to improve the checking of blade contours of turbomachines.

The present invention provides a blade contour checking means and a computer program product, in particular a data carrier or a machine-readable memory, having a computer program for carrying out such a method. A means in the meaning of the present invention may be designed as hardware and/or software and accordingly includes in particular a computer or a circuit, which is preferably integrated and/or programmable, and/or a program or program module, which executes a method according to the present invention when it runs on a computer.

To check a contour of one or multiple blades of a turbomachine, in particular guide blades and/or moving blades of one or multiple compressor stages and/or turbine stages of a gas turbine, preferably an aircraft engine, initially an actual contour of a blade to be checked is registered. This may be carried out in particular in a contacting way, preferably by a touching measuring machine, or in a contactless way, preferably by irradiation using electromagnetic radiation and registration of reflected and/or scattered radiation, inductively, and/or magnetically. In one preferred embodiment, the actual contour is registered discretely, by registering the position of a finite or limited number of points on the contour in relation to one another and/or to a reference system.

According to the present invention, a setpoint contour of the blade is scaled and the actual contour is compared to this scaled setpoint contour. Therefore, a comparison is no longer made directly as previously to a nominal setpoint contour, as is specified from CAD data, for example, but rather this contour is initially scaled and thus adapted to the actual contour. The comparison of the actual contour to this adapted setpoint contour allows a better judgment of the actual contour.

Scaling is understood in the present case in particular as a shape-invariant or geometrically similar change of the shape of the setpoint contour by enlargement or reduction in size, preferably proportional or to scale, and/or by displacement of the contour as a whole, although scaling in the meaning of the present invention may generally also include other changes of the setpoint contour, in particular with local change of its shape. A shape is understood in the present case in particular as a definition of the contour by a limited number of parameters, for example, the (local) definition by circles, center points and radii of curvature, connecting straight lines, conical sections, or the like. Thus, for example, an elliptical shape may be defined by its two main axes or the radii and center points of the main circles. In general, the setpoint contour may therefore be specified in particular by a scalable shape. Shape-invariant scaling accordingly includes the qualitative or dimensionless definition of the shape, for example, as a circle, ellipse, or the like. In particular, the setpoint contour may therefore be specified by a shape law, for example, "all points have the same distance (circle)/a linearly growing distance (spiral) to a point" or "combination of two circles and a straight line which tangentially connects them," this shape being quantified by the few parameters "radius of the first and second circles" and "position of the center point of one circle in relation to the other circle." In a preferred refinement, the shape is asymmetrical, i.e., in particular not a circle.

Accordingly, in one preferred embodiment, in general the setpoint contour is scaled by variation of precisely one or multiple parameters. For example, a circle may be scaled in a shape-invariant way by enlargement or reduction in size of its radius, i.e., its curvature, and/or by displacement of its center point in the meaning of the present invention. In one preferred refinement, an edge thickness dimension of the blade profile is varied. This is understood in the present case as the thickness of the blade at a predefined distance from a nose point, i.e., an outermost profile point.

In one preferred embodiment, the setpoint contour is scaled with respect to the actual contour based on at least one extreme condition. In particular, the setpoint contour may be scaled in such a way that a distance to the actual contour becomes minimal. The distance may in particular be defined by the sum or the greatest value of the absolute values or squares of the distances between points of the actual contour and points associated therewith of the setpoint contour, a point of the actual contour preferably being associated with the closest point of the setpoint contour. The setpoint contour is adapted in the best possible way, so to speak. In general, the extreme condition may include a metric of the distances between points of the actual contour and the setpoint contour for this purpose, for example, the above-explained sum of the squares of the distances.

To check the contour, in one preferred embodiment, a distance, in particular a maximum distance, of the actual contour from the scaled setpoint contour is ascertained. For this purpose, a distance between the actual contour and the scaled setpoint contour may be ascertained at one or multiple points of the actual contour or setpoint contour. Similarly, it is possible to specify a tolerance band around the scaled setpoint contour and to ascertain whether the actual contour lies within this tolerance band, i.e., the distance between the actual contour and the setpoint contour is always less than or equal to the width of the tolerance band. Such an ascertainment, as to whether a distance is always less than a specified limiting value, is designated in the present case as an ascertainment of a distance of the actual contour from the scaled setpoint contour. In one preferred refinement, the actual contour is compared to the scaled setpoint contour over a specified evaluation length, in particular in a specified area starting from a nose point of the blade.

If the setpoint contour is scaled and the actual contour is compared to the scaled setpoint contour according to the present invention, the risk fundamentally exists that the setpoint contour will be scaled excessively strongly. In this case, an actual contour which deviates excessively strongly from the—unscaled—setpoint contour, but equally everywhere, would incorrectly be judged as correct. Therefore, in one preferred refinement, an extreme scaling of the setpoint contour is specified, i.e., a permissible limit for the scaling. If the scaling is carried out by a variation of one or multiple parameters, for example, a lower limit and/or upper limit for such parameters may be specified.

By a comparison according to the present invention of the actual contour to the scaled setpoint contour, in particular a shape deviation of the actual contour may be recognized. This is advantageous in the case of the checking of blades of turbomachines, since to judge their quality, in particular their aerodynamic quality, their absolute dimensions are less important, rather their shape is more important, for example, a circular leading edge or trailing edge, an elliptical, parabola, or teardrop shape of an inlet area or outlet area or the like. Nevertheless, local extremes, in particular peaks or points having very large local curvatures, may be disadvantageous, in particular under structural-mechanical or production aspects. Therefore, in one preferred embodiment, one or multiple local extremes, in particular extremes of curvature, preferably maxima of curvature, of the actual contour are additionally ascertained. An extreme of curvature is also understood in the present case more generally as a peak, i.e., an area in which left side and right side tangent limiting values form an angle not equal to zero with one another. In particular, a minimum curvature of the actual contour may be ascertained and compared to a permissible curvature, to ascertain and evaluate such local extremes.

Preferably, one or multiple steps of a method according to the present invention are each carried out entirely or partially automatically. In particular, a registration means may at least partially automatically register an actual contour of a blade, in one preferred refinement a measured actual contour being able to be processed by filtering, smoothing, or the like. A specification means may specify a setpoint contour of the blade at least partially automatically, in particular based on CAD data of the blade. Additionally or alternatively, a scaling means may at least partially automatically scale the setpoint contour, for example, by ascertaining the distance to the actual contour and varying one or multiple parameters of the shape of the setpoint contour in such a way that this distance becomes minimal or falls below a specified limiting value. A comparison means may compare the actual contours to the scaled setpoint contour at least partially automatically, in particular by ascertaining whether the actual contour lies within a tolerance band having a specified width around the scaled setpoint contour.

BRIEF DESCRIPTION OF THE DRAWINGS

In the present case, both a radius and its reciprocal value are designated more generally as a curvature for a more compact description.

Further features and advantages result from the subclaims and the exemplary embodiments. In the partially schematic figures:

DETAILED DESCRIPTION

Figure 3:
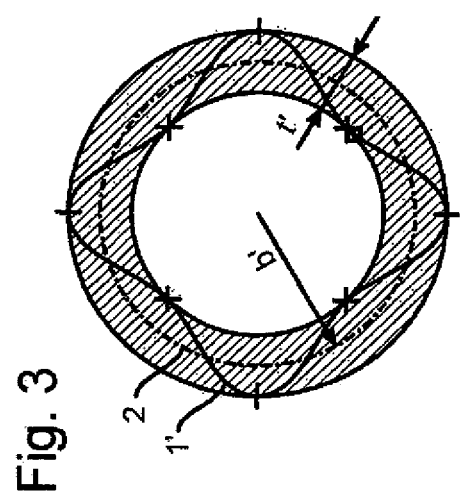
FIG. 3 shows a simplified actual contour and a scaled setpoint contour according to the present invention.

A method according to the present invention may initially be illustrated on the basis of FIG. 3. Eight measuring points, which a measuring machine has registered of an actual contour, are indicated by crosses therein. Actual contour 1' registered in this way accordingly extends through these measuring points.

The setpoint contour is specified by its shape in the form of a circle. It may be scaled in a shape-invariant way, i.e., without a qualitative change of the shape, by varying radius b' of the circle and the position of its center point.

The setpoint contour of the blade is scaled based on an extreme condition with respect to actual contour 1', by determining, for each of the measuring points of the actual contour, the distance to the point of the setpoint contour closest thereto, calculating the square thereof, summing these values, and varying the radius and the center point until this sum of the squares of the distances becomes minimal or at least falls below a specified limiting value. Correspondingly scaled setpoint contour 2 is shown in FIG. 3.

Actual contour 1' is compared to this scaled setpoint contour 2. For this purpose, a tolerance band of uniform thickness t' is laid around scaled setpoint contour 1, which is shown shaded in FIG. 3, and it is checked whether actual contour 1' lies completely within this tolerance band. If so, the shape of actual contour 1' only deviates to a permissible extent from the specified shape, which is circular in the exemplary embodiment. It is apparent that the method according to the present invention is well suitable for judging a shape deviation, which is more important from an aerodynamic aspect. In particular, narrower tolerance fields than previously may be specified for their judgment because of the adjustment according to the present invention of the setpoint contour.

Figure 1:
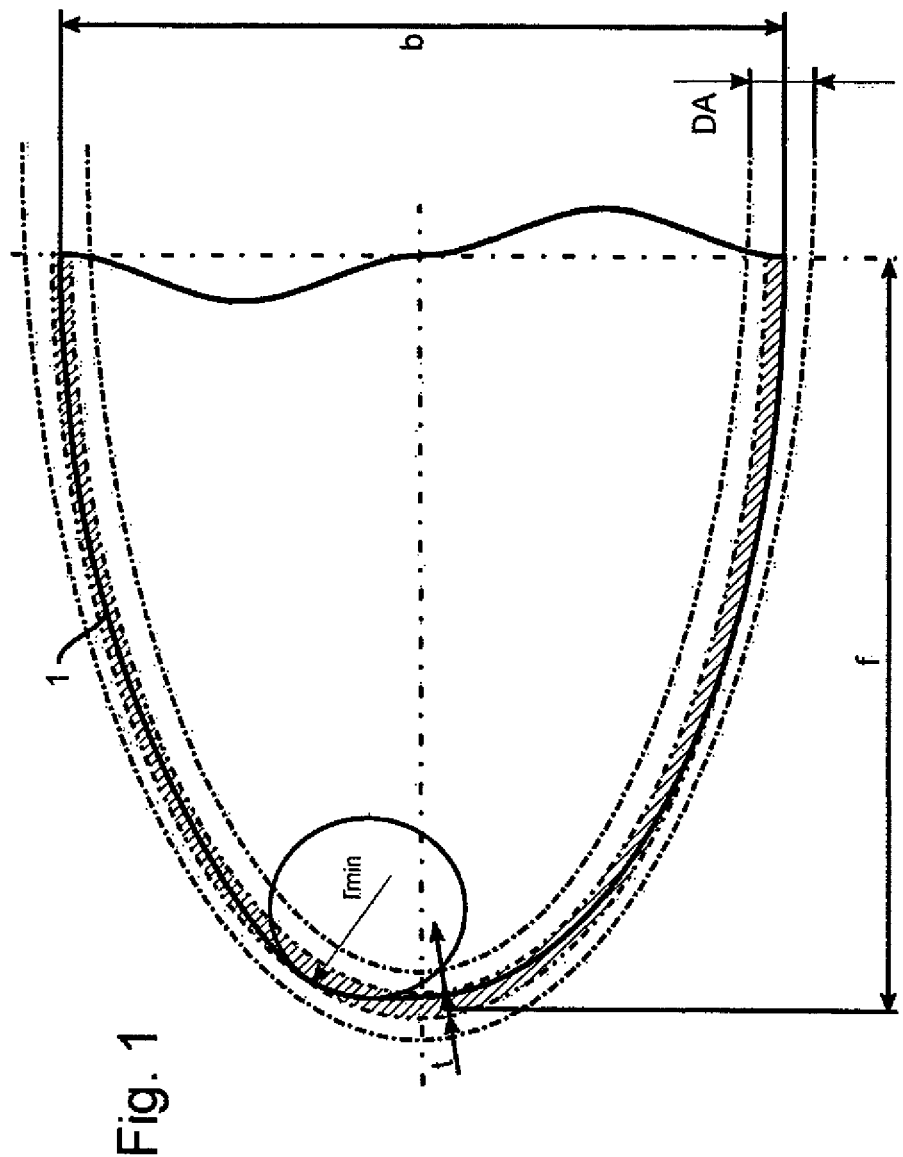
FIG. 1 shows a part of a blade contour which is checked according to one embodiment of the present invention.
Figure 2:
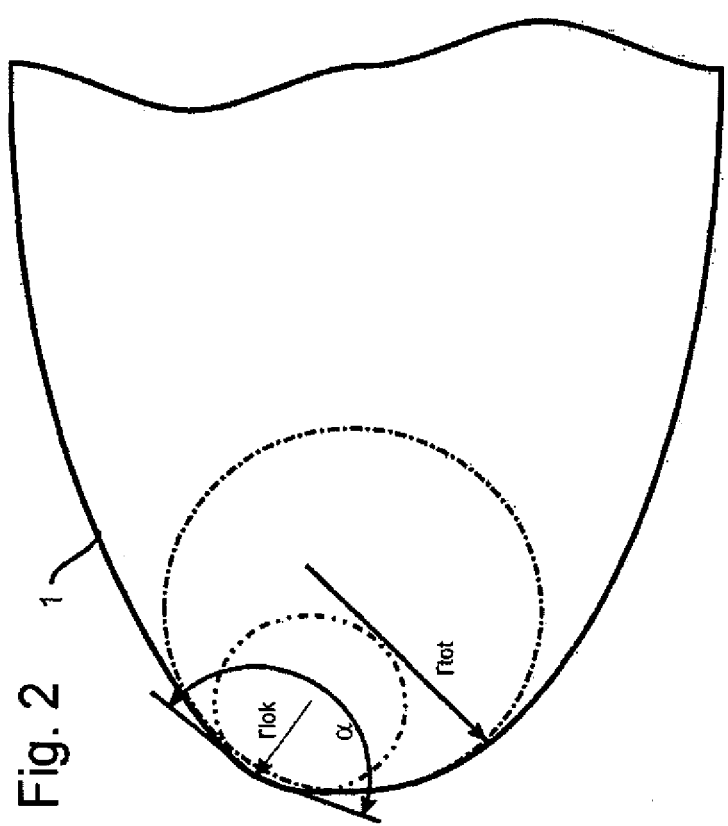
FIG. 2 shows a minimum inscribed circle of curvature and a setpoint edge radius of the blade contour of FIG. 1.

FIG. 1 shows a part of a blade contour 1, which is checked according to an embodiment of the present invention. The blade contour is to have an elliptical shape in the area of the leading edge (on the left in FIG. 1), in particular in the area of the nose point, the shape of the smaller main circle of the ellipse having edge radius $r_{tot}$ (see FIG. 2).

Previously, it has only been checked for this purpose whether actual contour 1 lies within a relatively wide tolerance band DA around a nominal setpoint contour having a corresponding elliptical shape. According to the present invention, the setpoint contour having the elliptical shape is initially scaled, as explained above as an example with reference to FIG. 3, until its distance, defined by the sum of the squares of the distance of the measuring points to the closest setpoint contour points, to actual contour 1 becomes minimal. For this purpose, for example, the position and/or the size of the main axes of the ellipse may be varied. In the preferred embodiment shown, edge thickness dimension b is varied, i.e., the thickness of the blade cross section at distance f from the nose point. Subsequently, a tolerance band t around the setpoint contour scaled in this way is laid within evaluation length f. For better clarity, only actual contour 1 is shown by a thick line in FIG. 1 and tolerance band t is shown shaded, but the scaled setpoint contour is omitted. It is apparent that the actual contour may be checked against the adjusted setpoint contour significantly more precisely for its shape deviation, by comparing it to tolerance band t, which is significantly smaller than DA. The check or the comparison is performed within evaluation length f, i.e., from the nose point up to the cross section having thickness b.

In addition to the shape deviation, which is important from an aerodynamic aspect, the size of local peaks, which is important from structural-mechanical aspects, is also to be checked.

For this purpose, within evaluation length f, the minimum inscribed circle is ascertained, whose curvature or radius $r_{lok}$ locally corresponds to the local curvature of actual contour 1. This radius $r_{lok}$ is compared to a permissible minimum radius and the blade is thus checked for impermissibly pointed local extremes. Instead of radius $r_{lok}$, for example, angle α may also be ascertained and compared to a limiting value, which the left side and right side tangents form at a local extreme of the actual contour, as shown as an example in FIG. 2.

The invention claimed is:

1. A method for checking a blade contour of a turbomachine, comprising:
    registering an actual contour of a blade;
    scaling a setpoint contour of the blade, the scaling being a shape-invariant or geometrically similar change of the setpoint contour by enlargement or reduction of the setpoint contour as a whole, the setpoint contour being scaled so that a distance to the actual contour becomes minimal; and
    comparing the actual contour to the scaled setpoint contour, in order to determine if the actual contour is within a predetermined tolerance band around the scaled setpoint contour.

2. The method as recited in claim 1 wherein the setpoint contour is scaled by variation of at least one parameter.

3. The method as recited in claim 1 wherein the setpoint contour is scaled on the basis of an extreme condition with respect to the actual contour.

4. The method as recited in claim 1 wherein the setpoint contour is specified by a shape.

5. The method as recited in claim 4 wherein the shape is asymmetrical.

6. The method as recited in claim 1 further comprising ascertaining a distance of the actual contour from the scaled setpoint contour.

7. The method as recited in claim 6 wherein the distance is a maximum distance.

8. The method as recited in claim 1 wherein an extreme scaling of the setpoint contour is specified.

9. The method as recited in claim 1 further comprising ascertaining at least one local extreme of the actual contour.

10. The method as recited in claim 9 wherein a minimum curvature of the actual contour is ascertained and compared to a permissible curvature.

11. The method as recited in claim 1 wherein the actual contour is compared to the scaled setpoint contour over a predefined evaluation length.

12. The method as recited in claim 1 wherein at least one method step is carried out at least partially automatically.

13. The method as recited in claim 1 wherein the turbomachine is a gas turbine.

14. A blade contour checker for checking a blade contour of a turbomachine, comprising:
    a registration for registering an actual contour of a blade;
    a specification for specifying a setpoint contour of the blade;
    a scaler for scaling the setpoint contour; and
    a comparator for comparing the actual contour to the scaled setpoint contour, the blade contour checker being configured to carry out the method as recited in claim 1.

15. A computer program product comprising a non-transitory computer-readable medium capable of being read to execute a computer program for carrying out the method steps recited in claim 1.

* * * * *